(12) United States Patent
Jung

(10) Patent No.: US 9,255,543 B2
(45) Date of Patent: Feb. 9, 2016

(54) FUEL INJECTION AMOUNT COMPENSATING METHOD

(71) Applicant: Hyundai Motor Company, Seoul (KR)

(72) Inventor: In Soo Jung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 215 days.

(21) Appl. No.: 14/010,198

(22) Filed: Aug. 26, 2013

(65) Prior Publication Data

US 2014/0172276 A1    Jun. 19, 2014

(30) Foreign Application Priority Data

Dec. 14, 2012 (KR) .................. 10-2012-0146798

(51) Int. Cl.
*F02M 7/28* (2006.01)
*F02D 41/40* (2006.01)
*F02D 35/02* (2006.01)
*F02D 41/28* (2006.01)

(52) U.S. Cl.
CPC ............ *F02D 41/403* (2013.01); *F02D 35/023* (2013.01); *F02D 2041/288* (2013.01); *F02D 2200/025* (2013.01); *Y02T 10/44* (2013.01)

(58) Field of Classification Search
CPC .............. F02D 41/403; F02D 35/023; F02D 2041/288; F02D 2200/025
USPC .......... 123/435; 701/103, 104, 111; 73/35.12, 73/114.16
See application file for complete search history.

(56) References Cited

U.S. PATENT DOCUMENTS

| 6,850,836 B1* | 2/2005 | Scholl ................... G01M 15/12 701/115 |
| 6,854,441 B2* | 2/2005 | Vermonet ............. F02D 41/403 123/294 |
| 7,484,405 B2* | 2/2009 | Hazelton ............. F02D 41/2432 73/114.07 |
| 2014/0012487 A1* | 1/2014 | Jung ............................ 701/104 |

FOREIGN PATENT DOCUMENTS

| JP | 2000-205022 A | 7/2000 |
| JP | 2001-234800 A | 8/2001 |
| JP | 2005-264814 | * 9/2005 .............. F02D 41/04 |

* cited by examiner

*Primary Examiner* — Hai Huynh
(74) *Attorney, Agent, or Firm* — Morgan, Lewis & Bockius LLP

(57) ABSTRACT

Disclosed is a fuel injection amount compensating method that may include measuring a real pressure of a combustion chamber, calculating a real pressure level of the combustion chamber based on the real pressure, calculating a real combustion noise index based on the real pressure level of the combustion chamber, calculating a target combustion noise index based on a driving condition, calculating a difference between the real combustion noise index and the target combustion noise index, and increasing or reducing a pilot injection amount of a fuel injector in accordance with the difference. Also disclosed is a fuel injection amount compensating system.

9 Claims, 6 Drawing Sheets

FIG. 4

| | | \multicolumn{7}{c}{INJECTION PRESSURE (bar)} |
|---|---|---|---|---|---|---|---|---|
| | | 300 | 500 | 800 | 1100 | 1400 | 1700 | 2000 |
| FUEL AMOUNT (mg) | 10 | 160 | 170 | 174 | 175 | 175 | 177 | 180 |
| | 20 | 164 | 174 | 178 | 177 | 178 | 177 | 181 |
| | 30 | 166 | 174 | 178 | 179 | 180 | 179 | 183 |
| | 40 | 170 | 174 | 180 | 180 | 181 | 182 | 185 |
| | 50 | 170 | 174 | 180 | 182 | 181 | 184 | 186 |

TARGET COMBUSTION NOISE INDEX

FIG. 6

| DIFFERENCE IN COMBUSTION NOISE INDICES (dB) | INJECTION PRESSURE (bar) | | | | | | | |
|---|---|---|---|---|---|---|---|---|
| | | 300 | 500 | 800 | 1100 | 1400 | 1700 | 2000 |
| +0.5 | | +0.2 | +0.2 | +0.2 | +0.2 | +0.2 | +0.2 | +0.2 |
| +1 | | +0.3 | +0.3 | +0.3 | +0.3 | +0.3 | +0.3 | +0.3 |
| +1.5 | | +0.35 | +0.35 | +0.35 | +0.35 | +0.35 | +0.35 | +0.35 |
| +2 | | +0.4 | +0.4 | +0.4 | +0.4 | +0.4 | +0.4 | +0.4 |
| +2.5 | | +0.45 | +0.45 | +0.45 | +0.45 | +0.45 | +0.45 | +0.45 |

(mg)

FUEL INJECTION AMOUNT COMPENSATING METHOD

CROSS-REFERENCE TO RELATED APPLICATION

The present application claims priority of Korean Patent Application No. 10-2012-0146798 filed Dec. 14, 2012, the entire contents of which application are incorporated herein for all purposes by this reference.

BACKGROUND OF INVENTION

1. Field of Invention

The present invention relates to a fuel injection amount compensating method of precisely compensating an amount of fuel injected by an injector to reduce vibration and noise mainly generated by a combustion process.

2. Description of Related Art

In generation, it is known that a diesel engine has larger vibration and noise than a gasoline vehicle. In order to reduce the vibration/noise, pilot injection is introduced.

In the pilot injection, before an injector performs main injection for combustion, a predetermined amount of fuel is previously injected at a predetermined point in time so that temperature of a combustion chamber is raised and a mixture of fuel and air is improved. The pilot injection is performed at least once and may be multiply performed in accordance with a driving condition.

Through the pilot injection, ignition delay is reduced and a rate of rise of combustion pressure is reduced. As the rate of rise of the combustion pressure is reduced, combustion noise is reduced.

On the other hand, as an operation period of an injector that injects fuel is increased, a pilot injection amount is reduced or increased by various causes. In general, the pilot injection amount is reduced.

As the pilot injection amount is reduced, the rate of rise of the combustion pressure of the combustion chamber is increased and vibration and noise are increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a fuel injection amount compensating method of compensating a pilot injection amount when the pilot injection amount is reduced or increased to reduce vibration and noise generated by a combustion chamber.

A fuel injection amount compensating method according to various aspects of the present invention may include measuring a real pressure of a combustion chamber, calculating a real pressure level of the combustion chamber based on the real pressure, calculating a real combustion noise index based on the real pressure level of the combustion chamber, calculating a target combustion noise index based on a driving condition, calculating a difference between the real combustion noise index and the target combustion noise index, and increasing or reducing a pilot injection amount of a fuel injector in accordance with the difference.

The real pressure of the combustion chamber may be sensed by a pressure sensor. The real pressure of the combustion chamber may be a fast Fourier transform (FFT) signal which is processed to calculate the real pressure level.

A specific frequency range may be filtered at the real pressure level so that the real combustion noise index may be calculated.

The driving condition may include at least one of a fuel injection pressure, a fuel injection amount, revolutions per minute (RPM) of an engine, a gear stage, an intake air temperature, a coolant temperature, an engine load, and a crank angle.

A fuel injection amount compensating system according to various aspects of the present invention may include a fuel injector that is disposed to inject a fuel into a combustion chamber, a pressure sensor that is disposed to measure a real pressure of the combustion chamber, a signal processor that is configured to calculate a real pressure level of the combustion chamber based on the real pressure, calculate a real combustion noise index based on the real pressure level of the combustion chamber, calculate a target combustion noise index based on a driving condition, and calculate a difference between the real combustion noise index and the target combustion noise index, and a controller that is configured to increase or reduce a pilot injection amount of a fuel injector in accordance with the difference.

The signal processor may process the real pressure of the combustion chamber by a fast Fourier transform (FFT) signal process to calculate the real pressure level.

The signal processor may filter a specific frequency range at the real pressure level to calculate the real combustion noise index.

The driving condition may comprise at least one of a fuel injection pressure, a fuel injection amount, revolutions per minute (RPM) of an engine, a gear stage, an intake air temperature, a coolant temperature, an engine load, and a crank angle.

Therefore, in the fuel injection amount compensating method and system of the present invention, the real pressure level is calculated using the real pressure of the combustion chamber and is converted into the real combustion noise index, the real combustion noise index is compared with the target combustion noise index, and the pilot injection amount is compensated using the difference between the real combustion noise index and the target combustion noise index so that noise and vibration generated by the combustion chamber may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a table illustrating target combustion noise indices in an exemplary fuel injection amount compensating method according to the present invention.

FIG. 6 is a table illustrating compensation amounts of pilot injection amounts in an exemplary fuel injection amount compensating method according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
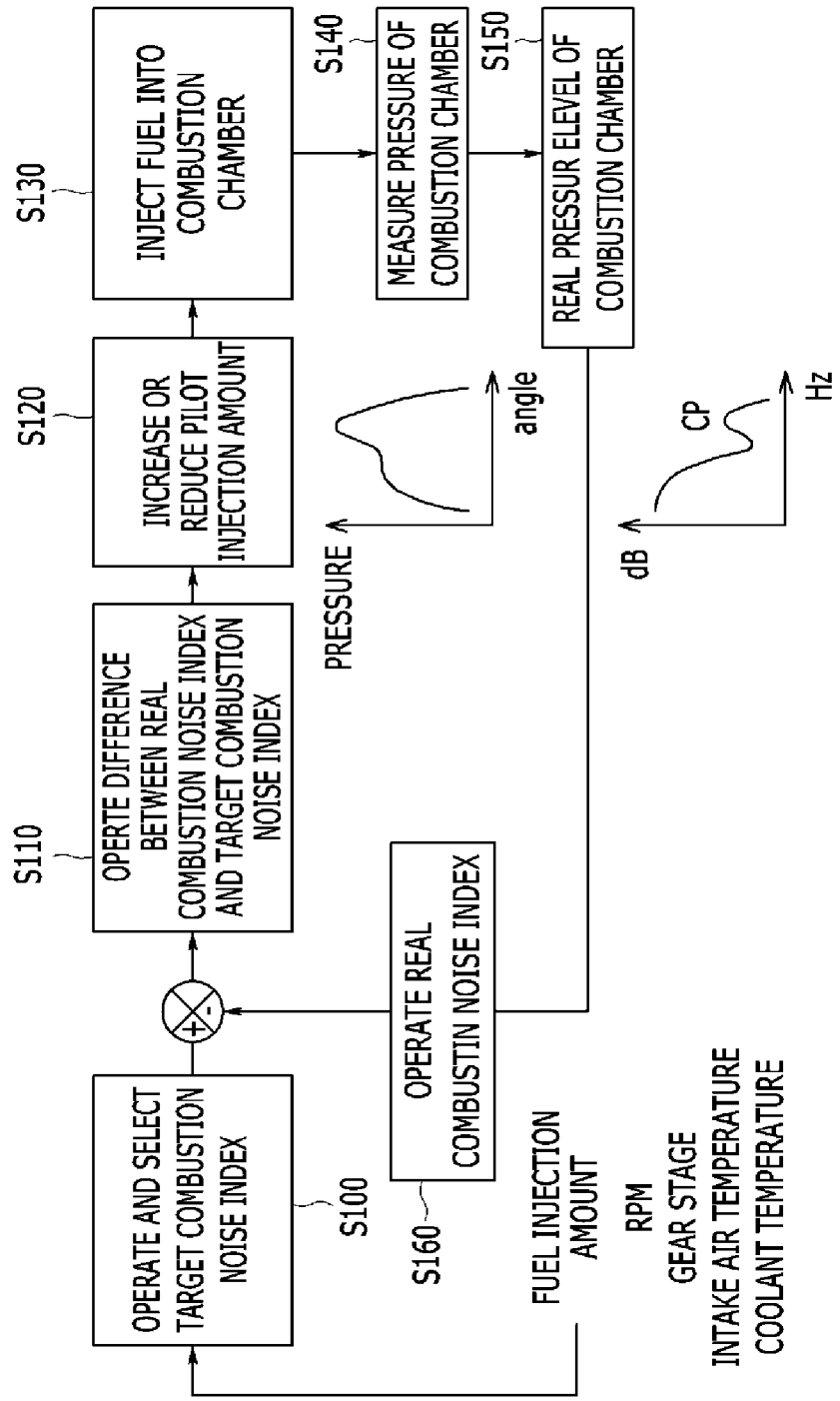
FIG. 1 is a flowchart illustrating an exemplary fuel injection amount compensating method according to the present invention.
Figure 2:
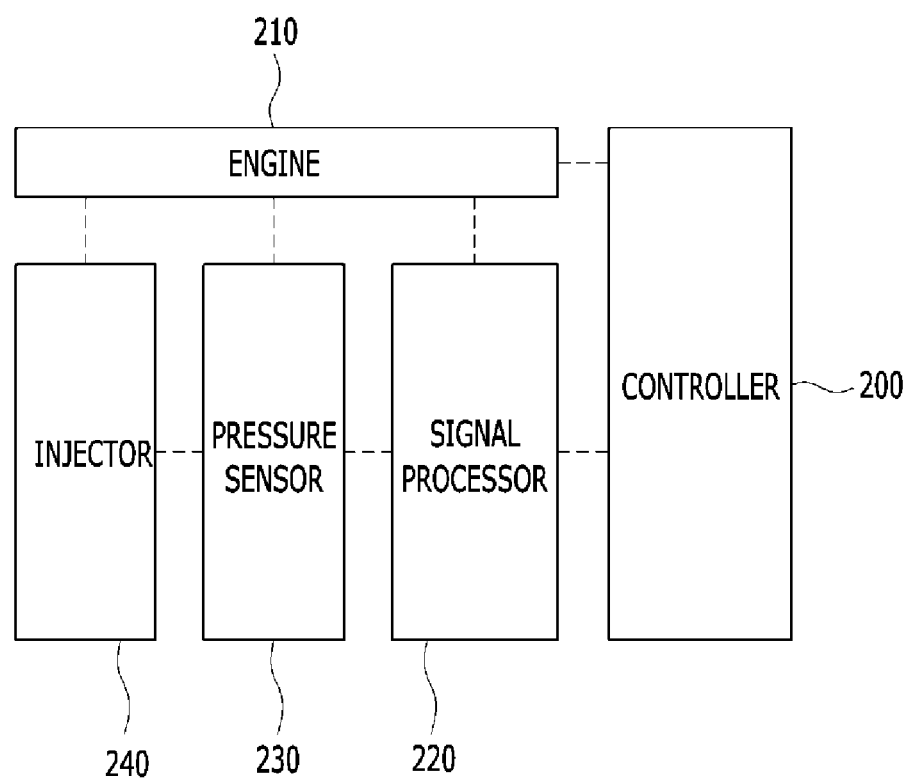
FIG. 2 is a schematic block diagram of an exemplary fuel injection amount compensating system according to the present invention.

FIG. 1 is a flowchart illustrating a fuel injection amount compensating method according to various embodiments of the present invention. FIG. 2 is a schematic block diagram of a fuel injection amount compensating system according to various embodiments of the present invention.

First, referring to FIG. 2, a fuel injection amount compensating system includes an engine 210 and the engine 210 includes a controller 200, a signal processor 220, a pressure sensor 230, and an injector 240.

The injector 240 injects a predetermined amount of fuel into a combustion chamber at predetermined time and the pressure sensor 230 senses pressure of the combustion chamber in real time.

The signal processor 220 processes real pressure of the combustion chamber that is measured in real time by a predetermined process to calculate a real pressure level. The controller 200 calculates a real combustion noise index by the real pressure level.

Furthermore, the controller 200 calculates a target combustion noise index in accordance with a driving condition of the engine 210, calculates a difference between the real combustion noise index and the target combustion noise index, and increases or reduces the pilot injection amount of the injector 240 when the difference is larger than a predetermined value.

Referring to FIG. 1, the injector 240 normally injects fuel into the combustion chamber in S130 and the pressure sensor 230 measures real pressure of a cylinder or combustion chamber in S140.

The signal processor 220, comprising a fast Fourier transmission (FFT) signal process, processes the real pressure of the cylinder to calculate a real pressure level of the cylinder in S150.

The controller 200 calculates a real combustion noise index based on the real pressure level of the cylinder in S160. Here, in order to extract the real combustion noise index, a specific frequency range (a band of 1 to 3.15 khz) may be filtered at the real pressure level.

Furthermore, the controller 200 calculates a target combustion noise index based on a driving condition. Here, the driving condition includes at least one of a fuel injection amount, revolutions per minute (RPM) of an engine, a gear stage, intake air temperature, coolant temperature, an engine load, and a crank angle.

The controller 200 calculates a difference between the target combustion noise index and the real combustion noise index in S110. The pilot injection amount of the injector 240 is increased or reduced in S120.

Here, in S110, the target combustion noise index is subtracted from the real combustion noise index and the pilot injection amount of the injector 240 is increased when the subtraction value is plus (positive) and is reduced when the subtraction value is minus (negative).

Figure 3:
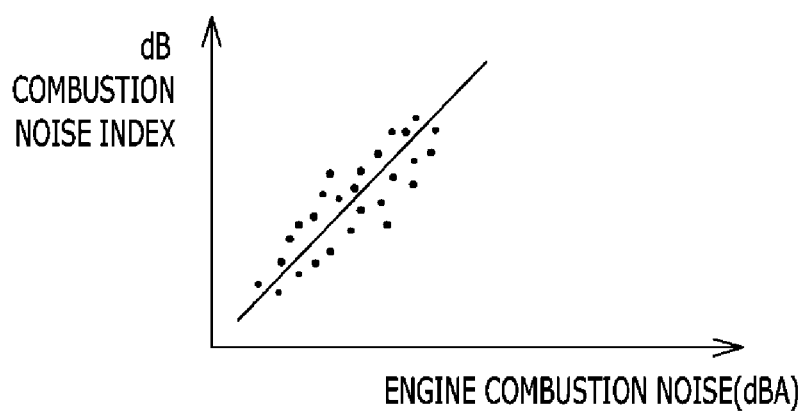
FIG. 3 is a graph illustrating a relationship between engine combustion noise and a combustion noise index in an exemplary fuel injection amount compensating method according to the present invention.

FIG. 3 is a graph illustrating a relationship between engine combustion noise and a combustion noise index in a fuel injection amount compensating method according to various embodiments of the present invention. Referring to FIG. 3, a horizontal axis represents combustion noise of the engine 210 (the combustion chamber) and a vertical axis represents a combustion noise index.

As illustrated in FIG. 3, as the combustion noise of the cylinder is increased, the combustion noise index is entirely increased along a uniform line and may be calculated or selected in accordance with real combustion noise.

FIG. 4 is a table illustrating target combustion noise indices in a fuel injection amount compensating method according to various embodiments of the present invention. Referring to FIG. 4, target combustion noise indices between fuel injection pressures and fuel injection amounts of the injector 240 are aligned in a table.

For example, when the injection pressure is 500 bar and the fuel injection amount is 30 mg, the target combustion noise index is 174. When the injection pressure is 1400 bar and the fuel injection amount is 40 mg, the target combustion noise index is 181.

The target combustion noise indices are calculated or experimented by experimental data to be previously stored in a map table.

Figure 5:
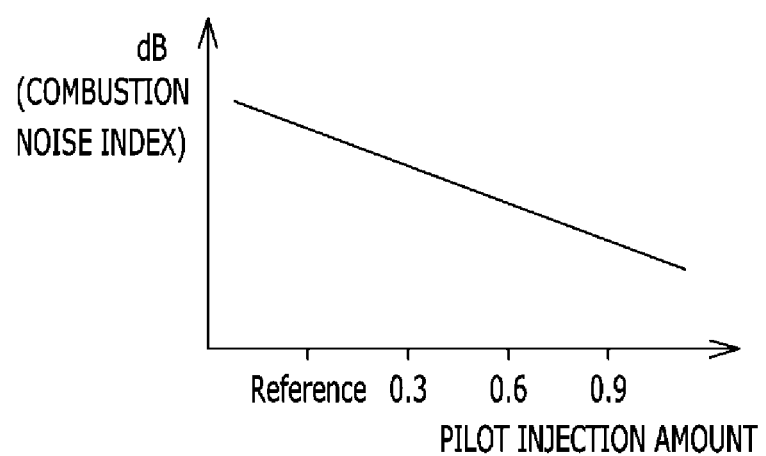
FIG. 5 is a graph illustrating a relationship between a pilot injection amount and a combustion noise index in an exemplary fuel injection amount compensating method according to the present invention.

FIG. 5 is a graph illustrating a relationship between a pilot injection amount and a combustion noise index in a fuel injection amount compensating method according to various embodiments of the present invention.

Referring to FIG. 5, a horizontal axis represents the pilot injection amount of the injector 240 and a vertical axis represents a combustion noise index. As illustrated in FIG. 5, as the pilot injection amount is increased, the combustion noise index is reduced.

FIG. 6 is a table illustrating compensation amounts of pilot injection amounts in a fuel injection amount compensating method according to various embodiments of the present invention.

Referring to FIG. 6, compensation amounts of pilot injection amounts at injection pressures are illustrated in accordance with combustion noise index differences.

For example, when the combustion noise index difference is 2 and the injection pressure is 800 bar, the pilot injection amount is increased by 0.4. When the combustion noise index difference is 1 and the injection pressure is 1,100 bar, the pilot injection amount is increased by 0.3.

According to various embodiments of the present invention, a point in time of the pilot injection of the injector 240 is predetermined.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A fuel injection amount compensating method, comprising:
    measuring a real pressure of a combustion chamber;
    determining a real pressure level of the combustion chamber based on the real pressure;
    determining a real combustion noise index based on the real pressure level of the combustion chamber;
    determining a target combustion noise index based on a driving condition of a vehicle;
    determining a difference between the real combustion noise index and the target combustion noise index; and
    increasing or reducing a pilot injection amount of a fuel injector in accordance with the difference.

2. The fuel injection amount compensating method of claim 1, wherein the real pressure of the combustion chamber is sensed by a pressure sensor.

3. The fuel injection amount compensating method of claim 1, wherein the real pressure of the combustion chamber is a fast Fourier transform (FFT) signal processed to determine the real pressure level.

4. The fuel injection amount compensating method of claim 1, wherein a specific frequency range is filtered at the real pressure level so that the real combustion noise index is determined.

5. The fuel injection amount compensating method of claim 1, wherein the driving condition of the vehicle comprises at least one of a fuel injection pressure, a fuel injection amount, revolutions per minute (RPM) of an engine, a gear stage, an intake air temperature, a coolant temperature, an engine load, and a crank angle.

6. A fuel injection amount compensating system, comprising:
    a fuel injector disposed to inject a fuel into a combustion chamber;
    a pressure sensor disposed to measure a real pressure of the combustion chamber;
    a signal processor configured to determine a real pressure level of the combustion chamber based on the real pressure, determine a real combustion noise index based on the real pressure level of the combustion chamber, determine a target combustion noise index based on a driving condition of a vehicle, and determine a difference between the real combustion noise index and the target combustion noise index; and
    a controller configured to increase or reduce a pilot injection amount of the fuel injector in accordance with the difference.

7. The fuel injection amount compensating system of claim 6, wherein the signal processor processes the real pressure of the combustion chamber by a fast Fourier transform (FFT) signal process to determine the real pressure level.

8. The fuel injection amount compensating system of claim 6, wherein the signal processor filters a specific frequency range at the real pressure level to determine the real combustion noise index.

9. The fuel injection amount compensating system of claim 6, wherein the driving condition of the vehicle comprises at least one of a fuel injection pressure, a fuel injection amount, revolutions per minute (RPM) of an engine, a gear stage, an intake air temperature, a coolant temperature, an engine load, and a crank angle.

* * * * *